(12) United States Patent
Kim

(10) Patent No.: US 9,932,881 B2
(45) Date of Patent: Apr. 3, 2018

(54) CONTROL METHOD AND SYSTEM FOR VEHICLE PROVIDED WITH WATER-COOLING INTERCOOLER APPARATUS

(71) Applicant: Hyundai Motor Company, Seoul (KR)

(72) Inventor: Hyungmin Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 225 days.

(21) Appl. No.: 14/696,442

(22) Filed: Apr. 26, 2015

(65) Prior Publication Data

US 2016/0138460 A1    May 19, 2016

(30) Foreign Application Priority Data

Nov. 14, 2014  (KR) .................. 10-2014-0158826

(51) Int. Cl.

| | |
|---|---|
| *F01P 7/14* | (2006.01) |
| *F01P 7/16* | (2006.01) |
| *F02D 23/00* | (2006.01) |
| *F02M 26/05* | (2016.01) |
| *F02M 26/06* | (2016.01) |
| *F02M 26/22* | (2016.01) |
| *F02M 26/33* | (2016.01) |

(Continued)

(52) U.S. Cl.
CPC .................. *F01P 7/16* (2013.01); *F01P 7/14* (2013.01); *F02B 29/0493* (2013.01); *F02D 23/00* (2013.01); *F02M 26/05* (2016.02); *F02M 26/06* (2016.02); *F02M 26/22* (2016.02); *F02M 26/33* (2016.02); *F02B 29/04* (2013.01); *F02M 26/35* (2016.02); *Y02T 10/144* (2013.01); *Y02T 10/146* (2013.01)

(58) Field of Classification Search
USPC ........................................ 123/41.1
See application file for complete search history.

(56) References Cited

U.S. PATENT DOCUMENTS

| | | | |
|---|---|---|---|
| 2006/0185626 A1* | 8/2006 | Allen ..................... | F01P 7/048 123/41.12 |
| 2009/0125217 A1* | 5/2009 | Nam .................... | F02D 41/0052 701/108 |
| 2012/0090584 A1* | 4/2012 | Jung ................... | F02D 41/0065 123/568.12 |

FOREIGN PATENT DOCUMENTS

| | | |
|---|---|---|
| JP | 2005-002983 A | 1/2005 |
| JP | 2013-104314 A | 5/2013 |

(Continued)

*Primary Examiner* — Lindsay Low
*Assistant Examiner* — Ruben Picon-Feliciano
(74) *Attorney, Agent, or Firm* — Mintz Levin Cohn Ferris Glovsky and Popeo, P.C.; Peter F. Corless

(57) ABSTRACT

A control method for a vehicle provided with a water-cooling intercooler apparatus, includes: detecting a coolant temperature of the water-cooling intercooler apparatus; detecting a rotation speed and a power consumption amount of an electric water pump (EWP) included in the water-cooling intercooler apparatus; calculating an efficiency value of the water-cooling intercooler apparatus based on the detected coolant temperature and air temperatures at an inlet and an outlet of an intercooler, respectively, included in the water-cooling intercooler apparatus; and determining whether the water-cooling intercooler apparatus is in a failure state based on the detected coolant temperature, the detected rotation speed and power consumption amount, and the calculated efficiency value.

5 Claims, 4 Drawing Sheets

(51) Int. Cl.
  *F02B 29/04* (2006.01)
  *F02M 26/35* (2016.01)

(56) References Cited

FOREIGN PATENT DOCUMENTS

| | | |
|---|---|---|
| KR | 10-2011-0058981 A | 6/2011 |
| KR | 10-2012-0057860 A | 6/2012 |
| KR | 10-2013-0017841 A | 2/2013 |
| KR | 10-1294424 B1 | 8/2013 |

* cited by examiner

CONTROL METHOD AND SYSTEM FOR VEHICLE PROVIDED WITH WATER-COOLING INTERCOOLER APPARATUS

CROSS-REFERENCE TO RELATED APPLICATION

This application claims priority to and the benefit of Korean Patent Application No. 10-2014-0158826 filed in the Korean Intellectual Property Office on Nov. 14, 2014, the entire contents of which are incorporated herein by reference.

BACKGROUND

(a) Technical Field

The present disclosure relates generally to a control method and system for a vehicle provided with a water-cooling intercooler apparatus, and more particularly, to a control method and system for a vehicle provided with a water-cooling intercooler apparatus that may control and drive the vehicle in a fail-safe mode.

(b) Description of the Related Art

It is generally known that engine power for a vehicle is controlled based on an air/fuel ratio. There are many methods to inject fuel into an engine, and many methods to draw air to the engine. An engine for a vehicle was first developed as a type of a naturally aspirated engine, and improved engines such as turbocharged engines, turbo-intercooled engines, and the like are being developed for increasing engine power, improving fuel efficiency, and reducing exhaust gas emissions.

In this regard, a turbo intercooler or an intercooler included in the turbo intercooler engine is an apparatus that increases engine power by increasing air density through cooling a compressed high-temperature air therein to increase intake air amount that is supplied to a cylinder of an engine. The turbo intercooler engine provided with the intercooler generates even greater engine power than a naturally aspirated engine and has various merits such as a long lifespan, reduction of vibration, noise, and exhaust gas, and enhancement of fuel efficiency due to having excellent power performance at a low speed.

Additionally, an intercooler apparatus that includes the intercooler and is applied to the turbo intercooler engine may have a similar structure to that of a radiator. The intercooler apparatus is classified into an air-cooling intercooler apparatus and a water-cooling intercooler apparatus. The air-cooling intercooler apparatus cools air supplied to an engine using air flowing into a vehicle engine while the vehicle is running, and the water-cooling intercooler apparatus cools air supplied to an engine using a coolant.

The air-cooling intercooler apparatus has, as shown in FIG. 1, a simpler structure than that of the water-cooling intercooler apparatus, but has inferior cooling efficiency. Meanwhile, the water-cooling intercooler apparatus has, as shown in FIG. 2, a structure that circulates a coolant of a radiator for an engine or a coolant of an exclusive radiator to cool supercharged air (e.g., high-temperature compressed air). Notably, failure of the air-cooling intercooler apparatus does not need to be monitored because of its simple structure, but failure of the water-cooling intercooler needs to be monitored since it includes a device, such as an electric water pump (EWP), that circulates a coolant.

The above information disclosed in this Background section is only for enhancement of understanding of the background of the disclosure, and therefore, it may contain information that does not form the related art that is already known in this country to a person of ordinary skill in the art.

SUMMARY

Accordingly, the present disclosure has been made in an effort to provide a control method and system for a vehicle provided with a water-cooling intercooler apparatus that may control and drive the vehicle in a fail-safe mode to protect the vehicle or an engine thereof when failure of the water-cooling intercooler apparatus is determined through monitoring an operation of the water-cooling intercooler apparatus.

For this purpose, embodiments of the present disclosure provide a control method for a vehicle provided with a water-cooling intercooler apparatus, including: detecting a coolant temperature of the water-cooling intercooler apparatus; detecting a rotation speed and a power consumption amount of an electric water pump (EWP) included in the water-cooling intercooler apparatus; calculating an efficiency value of the water-cooling intercooler apparatus based on the detected coolant temperature and air temperatures at an inlet and an outlet of an intercooler, respectively, included in the water-cooling intercooler apparatus; and determining whether the water-cooling intercooler apparatus is in a failure state based on the detected coolant temperature, the detected rotation speed and power consumption amount, and the calculated efficiency value.

The control method may further include: driving the EWP when the detected coolant temperature is greater than or equal to a predetermined temperature; determining whether the detected coolant temperature is greater than or equal to a predetermined target temperature when the EWP has been driven for a predetermined time; determining whether the detected rotation speed and power consumption amount are within predetermined normal ranges when the detected coolant temperature is greater than or equal to the predetermined target temperature; and determining that the EWP is in the failure state and driving the vehicle in a fail-safe mode when the detected rotation speed and power consumption amount of the EWP are outside of the predetermined normal ranges.

The control method may further include determining whether the calculated efficiency value is within a predetermined normal range when the detected rotation speed and power consumption amount are within the predetermined normal ranges; and determining that the water-cooling intercooler apparatus is in the failure state and driving the vehicle in the fail-safe mode when the calculated efficiency value is outside of the predetermined normal range.

The efficiency value of the water-cooling intercooler apparatus may be calculated using the following equation:

$$Eta_{WCAC} = \frac{T_{in} - T_{out}}{T_{in} - T_{water}},$$

where $Eta_{WCAC}$ is the efficiency value of water-cooling intercooler apparatus, $T_{in}$ is the air temperature at the inlet of the intercooler, $T_{out}$ is the air temperature at the outlet of the intercooler, and $T_{water}$ is the coolant temperature of the water-cooling intercooler apparatus.

Furthermore, according to embodiments of the present disclosure, a control system for a vehicle provided with a water-cooling intercooler apparatus includes: a radiator configured to lower a coolant temperature of a water-cooling intercooler apparatus; an electric water pump (EWP) configured to circulate a coolant of the water-cooling intercooler apparatus; a coolant temperature sensor configured to detect the coolant temperature of the water-cooling intercooler apparatus; a first air temperature sensor configured to detect an air temperature at an inlet of an intercooler included in the water-cooling intercooler apparatus; a second air temperature sensor configured to detect an air temperature at an outlet of the intercooler; and a controller configured to determine whether the water-cooling intercooler apparatus is a failure state based on the detected coolant temperature, a rotation speed and a power consumption amount of the EWP, and a efficiency value of the water-cooling intercooler apparatus.

The controller may be further configured to determine that the EWP is in a failure state and drive the vehicle in a fail-safe mode when the rotation speed and power consumption amount are outside of predetermined normal ranges.

The controller may be further configured to determine that the water-cooling intercooler apparatus is in the failure state and drive the vehicle in the fail-safe mode when the efficiency value is outside of a predetermined normal range.

The efficiency value of the water-cooling intercooler apparatus may be calculated using the following equation:

$$Eta_{WCAC} = \frac{T_{in} - T_{out}}{T_{in} - T_{water}},$$

where $Eta_{WCAC}$ is the efficiency value of water-cooling intercooler apparatus, $T_{in}$ is the air temperature at the inlet of the intercooler, $T_{out}$ is the air temperature at the outlet of the intercooler, and $T_{water}$ is the coolant temperature of the water-cooling intercooler apparatus.

As described above, according to embodiments of the present disclosure, the control method and system for the vehicle provided with the water-cooling intercooler can be provided to protect the vehicle or the engine thereof by controlling and driving the vehicle in the fail-safe mode when failure of the water-cooling intercooler apparatus is determined by monitoring an operation of the water-cooling intercooler apparatus.

DETAILED DESCRIPTION OF THE EMBODIMENTS

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

The terminology used herein is for the purpose of describing particular embodiments only and is not intended to be limiting of the disclosure. In the specification, unless explicitly described to the contrary, the word "comprise" and variations such as "comprises" or "comprising" will be understood to imply the inclusion of stated elements but not the exclusion of any other elements. The singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 1:
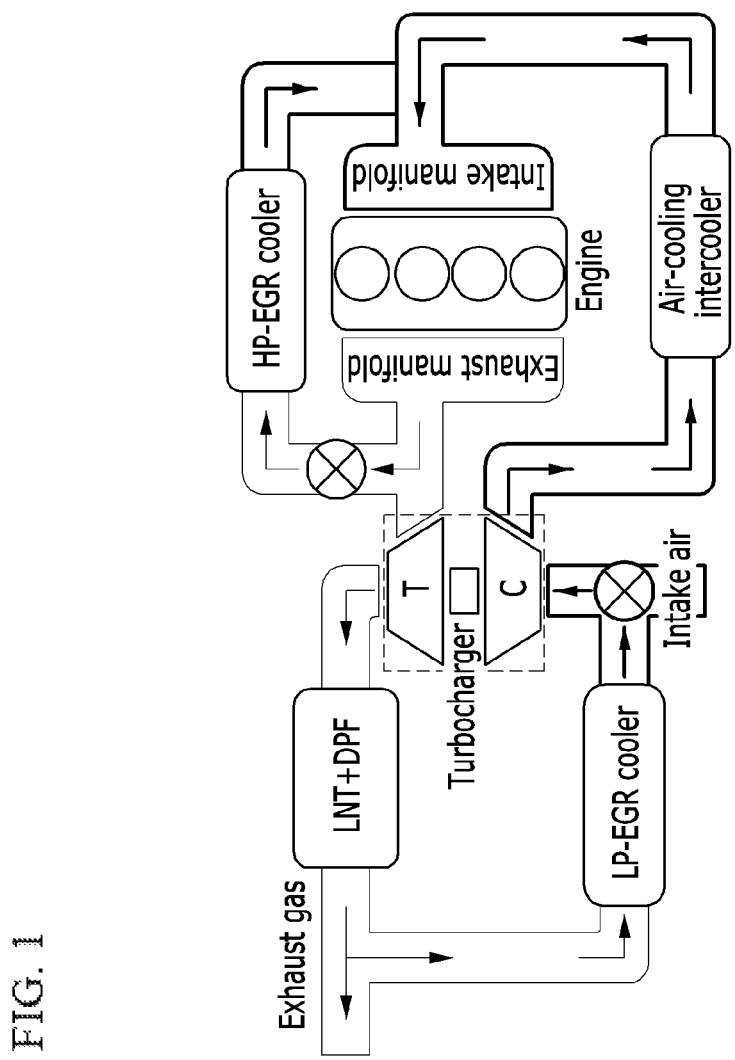
FIG. 1 is a schematic diagram which illustrates a typical air-cooling intercooler apparatus.
Figure 2:
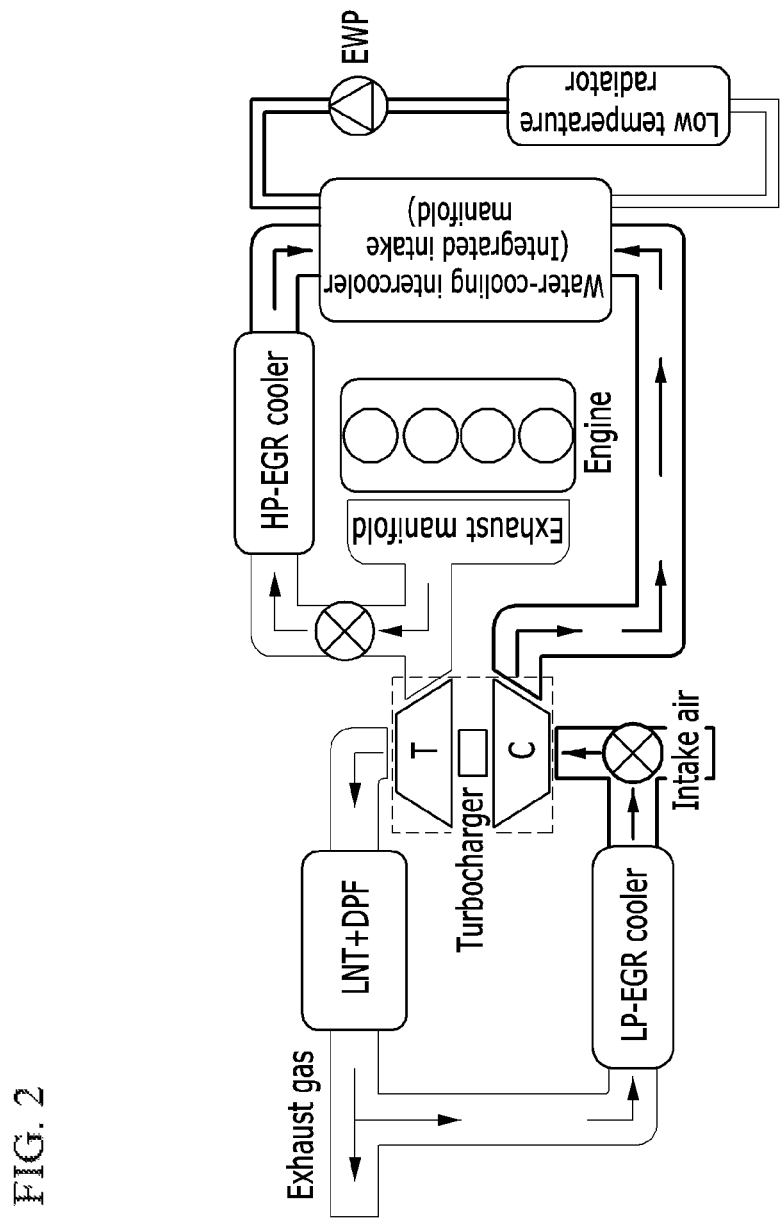
FIG. 2 is a schematic diagram which illustrates a typical water-cooling intercooler apparatus.
Figure 3:
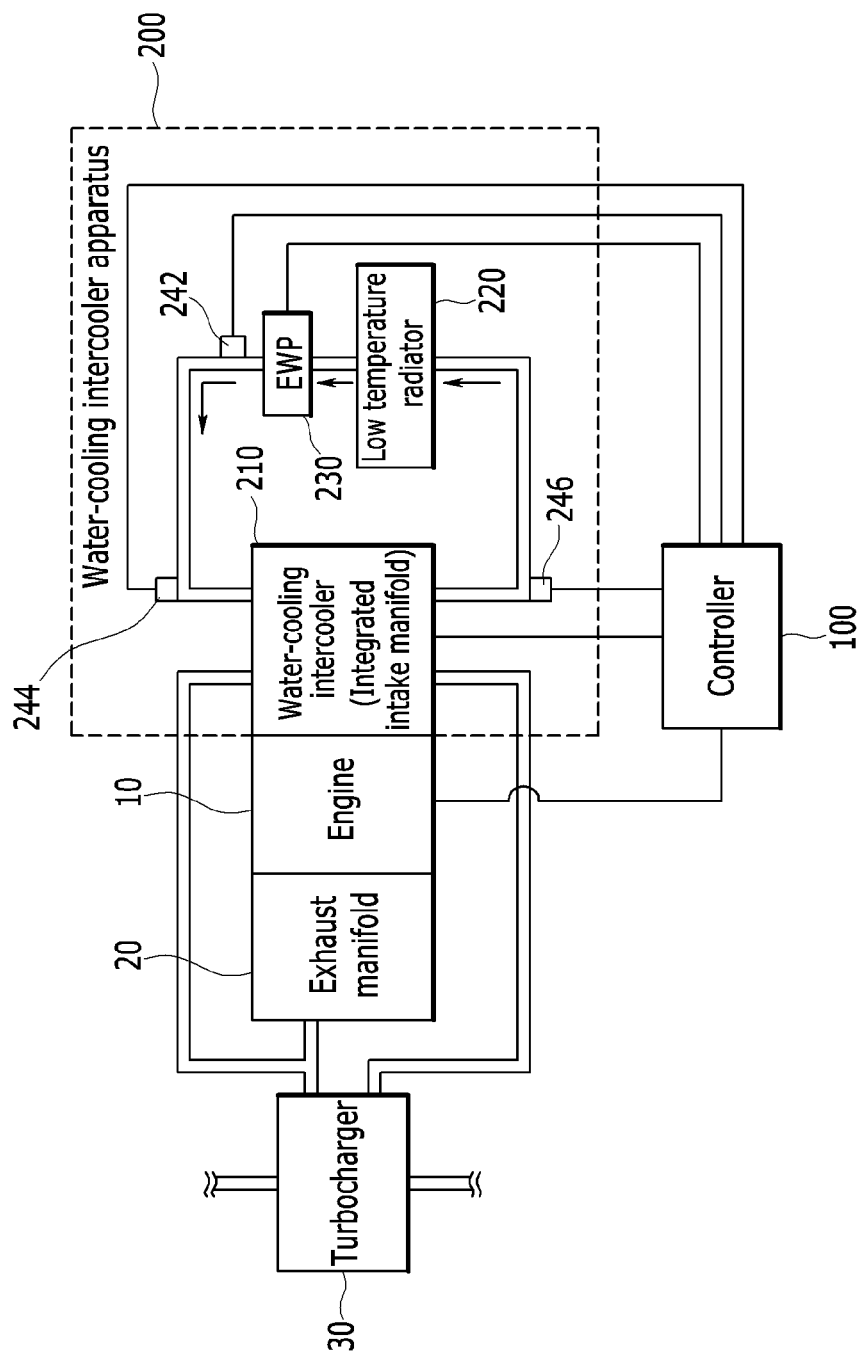
FIG. 3 is a block diagram that illustrates a control system for a vehicle provided with a water-cooling intercooler apparatus according to embodiments of the present disclosure.

Referring now to the disclosed embodiments, FIG. 3 is a block diagram that illustrates a control system for a vehicle provided with a water-cooling intercooler apparatus according to embodiments of the present disclosure.

A control system for a vehicle provided with a water-cooling intercooler apparatus according to embodiments of the present disclosure is a system that controls and drives the vehicle in a fail-safe mode to protect the vehicle or an engine thereof when failure of the water-cooling intercooler apparatus is determined through monitoring an operation of the water-cooling intercooler apparatus. The control system includes: a radiator 220 configured to lower a coolant temperature of a water-cooling intercooler apparatus 200; an electric water pump (EWP) 230 configured to circulate a coolant of the water-cooling intercooler apparatus 200; a coolant temperature sensor 242 configured to detect a coolant temperature of the water-cooling intercooler apparatus 200; a first air temperature sensor 244 configured to detect an air temperature at an inlet of an intercooler 210 included in the water-cooling intercooler apparatus 200; a second air temperature sensor 246 configured to detect an air temperature at an outlet of the intercooler 210; and a controller 100 configured to determine whether the water-cooling intercooler apparatus 200 is in a failure state, and to drive a vehicle based on the coolant temperature, a rotation speed and power consumption of the EWP 230, and an efficiency value of the water-cooling intercooler apparatus 200.

The intercooler 210 may be configured to be an integrated type with an intake manifold.

The radiator 220 and the EWP 230 included in the water-cooling intercooler apparatus 200 may be those typically applied in the related art, so the detailed description thereof will be omitted in the present specification.

The coolant temperature sensor 242 may be a typical coolant temperature sensor in the related art, but it should be understood that the scope of the present disclosure is not limited thereto. Even if the configurations are different from the above configuration, the technical spirit of the present disclosure may be applicable to any configuration that can substantially detect or measure the temperature of the coolant. Coolant temperatures detected by the coolant temperature sensor 242 may be replaced with modeling coolant temperatures which may be obtained through predetermined simulations or tests. Accordingly, in this case, the coolant temperature sensor 242 may be removed.

The first air temperature sensor 244 may be a typical air temperature sensor in the related art, but it should be understood that the scope of the present disclosure is not limited thereto. Even if the configurations are different from the above configuration, the technical spirit of the present disclosure may be applicable to any configuration that can substantially detect or measure air temperatures at the inlet side of the intercooler 210. The air temperatures detected at the inlet side of the intercooler 210 by the first air temperature sensor 244 may be replaced with modeling air temperatures which may be obtained through predetermined simulations or tests. Accordingly, in this case, the first air temperature sensor 244 may be removed.

The controller 100 may include one or more microprocessors and/or hardware including a microprocessor that can be operated by a predetermined program, and the predetermined program may include a series of commands for executing the control method for the vehicle provided with the water-cooling intercooler apparatus, as described in further detail below. The controller 100 may include, for example, an engine electronic control unit (ECU) that controls an engine 10 to which air is supplied by a turbocharger 30 associated with an exhaust manifold 20, or may be included in the ECU.

Hereinafter, a control method for a vehicle provided with a water-cooling intercooler apparatus according to embodiments of the present disclosure will be described in detail with reference to the accompanying drawings.

Figure 4:
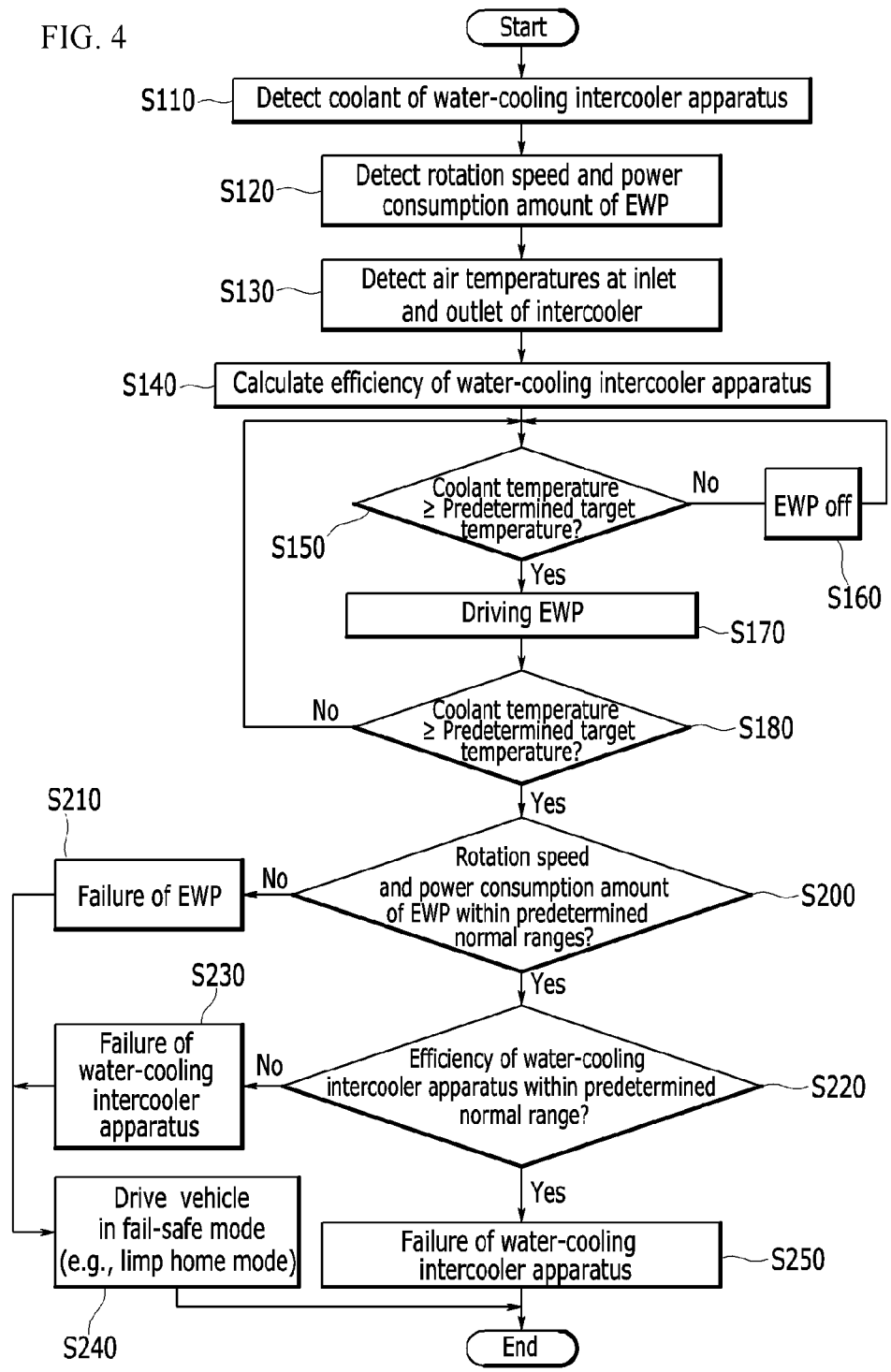
FIG. 4 is a flowchart that illustrates a control method for a vehicle provided with a water-cooling intercooler apparatus according to embodiments of the present disclosure.

FIG. 4 is a flowchart that illustrates a control method for a vehicle provided with a water-cooling intercooler apparatus according to embodiments of the present disclosure.

As shown in FIG. 4, the controller 100 detects a coolant temperature of the water-cooling intercooler apparatus 200 through the coolant temperature sensor 242 while a vehicle is running (S110). A method of detecting the coolant temperature of the water-cooling intercooler apparatus 200 through the coolant temperature sensor 242 may follow a general method or a method of the conventional art.

In addition, the controller 100 detects or measures a rotation speed and a power consumption amount of the EWP 230 while the vehicle is running (S120). The rotation speed and the power consumption amount of the EWP 230 may be detected by a well-known method of detecting a rotation speed and the power consumption amount of a motor or a pump, or a method of the conventional art.

Next, the controller 100 detects air temperatures at an inlet side and an outlet side of the intercooler 210 using the first air temperature sensor 244 and the second air temperature sensor 246 (S130). The air temperatures at the inlet side and the outlet side of the intercooler 210 may be detected using a conventional method of detecting air temperature, which is apparent to a person skilled in the art.

When the air temperatures at the inlet side and the outlet side of the intercooler 210 are detected, the controller 100 calculates an efficiency value of the water-cooling intercooler apparatus 200 based on the air temperatures at the inlet and the outlet of the intercooler 210 and the detected coolant temperature (S140). For example, the controller 100 may calculate the efficiency value of the water-cooling intercooler apparatus 200 through the following equation:

$$Eta_{WCAC} = \frac{T_{in} - T_{out}}{T_{in} - T_{water}},$$

where $Eta_{WCAC}$ is the efficiency value of water-cooling intercooler apparatus, $T_{in}$ is the air temperature at the inlet of the intercooler, $T_{out}$ is the air temperature at the outlet of the intercooler, and $T_{water}$ is the coolant temperature of water-cooling intercooler apparatus.

When the coolant temperature, the rotation speed and the power consumption amount of the EWP 230 and the efficiency value of the water-cooling intercooler apparatus 200 are detected and calculated, the controller 100 may determine whether the water-cooling intercooler apparatus 200 is in a failure state based thereon. For example, when the coolant temperature is greater than or equal to a predetermined target temperature (S150), the controller 100 drives the EWP 230 (S170). Conversely, when the coolant temperature is less than the predetermined target temperature, the controller 100 does not drive the EWP 230 (S160). The predetermined target temperature may be set as various values in consideration of a design aspect of the water-cooling intercooler apparatus and the engine.

When the EWP 230 is driven for a predetermined time at step S170, the controller 100 determines whether the coolant temperature is greater than or equal to a predetermined target temperature (S180). When the coolant temperature is greater than or equal to a predetermined target temperature at step S180, the controller 100 determines whether the rotation speed and the power consumption amount of the EWP 230 are within predetermined normal ranges (S200), and otherwise returns to step S150. The predetermined target temperature and the predetermined normal ranges may be set as various values in consideration of a design aspect of the water-cooling intercooler apparatus and the engine.

When the rotation speed and the power consumption amount of the EWP 230 are outside the predetermined normal ranges at step S180, the controller 100 determines that the EWP 230 is in a failure state, and drives the vehicle in a fail-safe mode (e.g., a limp-home mode) to protect the engine 10, the vehicle, a driver, and passengers (S210 to S240). The fail-safe mode may be the limp-home mode, but it should be understood that the scope of the present disclosure is not limited thereto. The technical spirit of the present disclosure may be applicable to other fail-safe modes that can substantially be a fail-safe mode for the vehicle.

When the rotation speed and the power consumption amount of the EWP 230 are within the predetermined normal ranges at step S200, the controller 100 determines whether the efficiency value of the water-cooling intercooler apparatus 200 is within a predetermined normal range. When the efficiency value of the water-cooling intercooler apparatus 200 is outside the predetermined normal range, the controller 100 determines that the water-cooling intercooler apparatus 200 is in a failure state, and drives the vehicle in a fail-safe mode (S230 and S240). The predetermined normal range of the efficiency value of the water-cooling intercooler apparatus 200 may be set as various values in consideration of a design aspect of the water-cooling intercooler apparatus and the engine, which is apparent to those skilled in the art.

When the efficiency value of the water-cooling intercooler apparatus 200 is outside the predetermined normal range at step S220, the controller 100 normally drives the vehicle since the water-cooling intercooler apparatus 200 is normally driven (S250).

Accordingly, according to embodiments of the present disclosure, the control method and system for the vehicle provided with the water-cooling intercooler apparatus can protect the vehicle, the engine thereof, a driver, and passengers by controlling and driving the vehicle in a fail-safe mode when failure of the water-cooling intercooler apparatus is determined by monitoring an operation of the water-cooling intercooler apparatus.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

10: engine
100: controller
200: water-cooling intercooler apparatus
210: intercooler
220: radiator
230: electric water pump (EWP)

What is claimed is:

1. A control method for a vehicle provided with a water-cooling intercooler apparatus, comprising:
   detecting a coolant temperature of the water-cooling intercooler apparatus;
   detecting a rotation speed and a power consumption amount of an electric water pump (EWP) included in the water-cooling intercooler apparatus;
   calculating an efficiency value of the water-cooling intercooler apparatus based on the detected coolant temperature and air temperatures at an inlet and an outlet of an intercooler, respectively, included in the water-cooling intercooler apparatus;
   determining whether the water-cooling intercooler apparatus is in a failure state based on the detected coolant temperature, the detected rotation speed and power consumption amount, and the calculated efficiency value;
   driving the vehicle in a fail-safe mode when the water-cooling intercooler apparatus is in the failure state;
   driving the EWP when the detected coolant temperature is greater than or equal to a predetermined temperature;
   determining whether the detected coolant temperature is greater than or equal to a predetermined target temperature when the EWP has been driven for a predetermined time;
   determining whether the detected rotation speed and power consumption amount are within predetermined normal ranges when the detected coolant temperature is greater than or equal to the predetermined target temperature; and
   determining that the EWP is in the failure state and driving the vehicle in the fail-safe mode when the detected rotation speed and power consumption amount are outside of the predetermined normal ranges.

2. The control method of claim 1, further comprising:
   determining whether the calculated efficiency value is within a predetermined normal range when the detected rotation speed and power consumption amount are within the predetermined normal ranges; and
   determining that the water-cooling intercooler apparatus is in the failure state and driving the vehicle in the fail-safe mode when the calculated efficiency value is outside of the predetermined normal range.

3. The control method of claim 2, wherein the efficiency value of the water-cooling intercooler apparatus is calculated using the following equation:

$$Eta_{WCAC} = \frac{T_{in} - T_{out}}{T_{in} - T_{water}},$$

where $Eta_{WCAC}$ is the efficiency value of water-cooling intercooler apparatus, $T_{in}$ is the air temperature at the inlet of the intercooler, $T_{out}$ is the air temperature at the outlet of the intercooler, and $T_{water}$ is the coolant temperature of the water-cooling intercooler apparatus.

4. A control system for a vehicle provided with a water-cooling intercooler apparatus, comprising:
   a radiator configured to lower a coolant temperature of a water-cooling intercooler apparatus;
   an electric water pump (EWP) configured to circulate a coolant of the water-cooling intercooler apparatus;
   a coolant temperature sensor configured to detect the coolant temperature of the water-cooling intercooler apparatus;
   a first air temperature sensor configured to detect an air temperature at an inlet of an intercooler included in the water-cooling intercooler apparatus;
   a second air temperature sensor configured to detect an air temperature at an outlet of the intercooler; and
   a controller configured to determine whether the water-cooling intercooler apparatus is in a failure state based on the detected coolant temperature, a rotation speed and power consumption amount of the EWP, and an efficiency value of the water-cooling intercooler apparatus, calculating the efficiency value of the water-cooling intercooler apparatus based on the detected coolant temperature and air temperatures at the inlet and the outlet of the intercooler, respectively, included in the water-cooling intercooler apparatus;
   wherein the controller is further configured to drive the vehicle in a fail-safe mode when the water-cooling intercooler apparatus is in the failure state, and
   wherein the controller is further configured to determine that the EWP is in a failure state and drive the vehicle in the fail-safe mode when the rotation speed and power consumption amount are outside of predetermined normal ranges; wherein the controller is further configured to determine that the water-cooling intercooler apparatus is in the failure state and drive the vehicle in the fail-safe mode when the efficiency value is outside of a predetermined normal range.

5. The control system of claim 4, wherein the efficiency value of the water-cooling intercooler apparatus is calculated using the following equation:

$$Eta_{WCAC} = \frac{T_{in} - T_{out}}{T_{in} - T_{water}},$$

where $Eta_{WCAC}$ is the efficiency value of water-cooling intercooler apparatus, $T_{in}$ is the air temperature at the inlet of the intercooler, $T_{out}$ is the air temperature at the outlet of the intercooler, and $T_{water}$ is the coolant temperature of the water-cooling intercooler apparatus.

\* \* \* \* \*